W. SCHOOLING.
ADDING AND LISTING MACHINE.
APPLICATION FILED MAR. 2, 1909.

974,996.

Patented Nov. 8, 1910.
8 SHEETS—SHEET 1.

Fig. 1.

ATTEST.
Bent. M. Stahl
Edward N. Saxton

INVENTOR.
WILLIAM SCHOOLING.
By Spear, Middleton, Donaldson & Spear
ATTY'S.

W. SCHOOLING.
ADDING AND LISTING MACHINE.
APPLICATION FILED MAR. 2, 1909.

974,996.

Patented Nov. 8, 1910.
8 SHEETS—SHEET 2.

Fig. 2.

ATTEST.
Ben. H. Stahl,
Edward N. Paxton.

INVENTOR.
WILLIAM SCHOOLING.
BY Spear, Middleton, Donaldson & Spear,
ATTY'S.

W. SCHOOLING.
ADDING AND LISTING MACHINE.
APPLICATION FILED MAR. 2, 1909.

974,996.

Patented Nov. 8, 1910.
8 SHEETS—SHEET 3.

Fig. 3.

ATTEST,
Bent M. Stahl,
Edward N. Larton

INVENTOR.
WILLIAM SCHOOLING.
By Spear, Middleton, Donaldson & Spear
ATTY'S.

W. SCHOOLING.
ADDING AND LISTING MACHINE.
APPLICATION FILED MAR. 2, 1909.

974,996.

Patented Nov. 8, 1910.
8 SHEETS—SHEET 4.

ATTEST.
Bent. M. Stahl
Edward N. Stanton

INVENTOR.
WILLIAM SCHOOLING.
By Spear, Middleton, Donaldson & Spear
ATTY'S.

W. SCHOOLING.
ADDING AND LISTING MACHINE.
APPLICATION FILED MAR. 2, 1909.

974,996.

Patented Nov. 8, 1910.

ATTEST.
Bent. M. Stahl.
Edward N. Santon

INVENTOR.
WILLIAM SCHOOLING.
By Spear, Middleton, Donaldson & Spear
ATTY'S.

THE NORRIS PETERS CO., WASHINGTON, D. C.

Fig. 7.

W. SCHOOLING.
ADDING AND LISTING MACHINE.
APPLICATION FILED MAR. 2, 1909.

974,996.

Patented Nov. 8, 1910.
8 SHEETS—SHEET 7.

ATTEST.
Bentt Stahl
Edward N Saxton

INVENTOR.
WILLIAM SCHOOLING.
By Spear, Middleton, Donaldson & Spear
ATTYS.

W. SCHOOLING.
ADDING AND LISTING MACHINE.
APPLICATION FILED MAR. 2, 1909.

974,996.

Patented Nov. 8, 1910.

UNITED STATES PATENT OFFICE.

WILLIAM SCHOOLING, OF WESTMINSTER, LONDON, ENGLAND, ASSIGNOR TO THE SCHOOLING CALCULATING MACHINE COMPANY LIMITED, OF LONDON, ENGLAND.

ADDING AND LISTING MACHINE.

974,996.  Specification of Letters Patent.  Patented Nov. 8, 1910.

Application filed March 2, 1909. Serial No. 480,974.

*To all whom it may concern:*

Be it known that I, WILLIAM SCHOOLING, a subject of the King of Great Britain and Ireland, residing at 81 Page street, Westminster, London, S. W., England, have invented certain new and useful Improvements in Adding and Listing Machines, of which the following is a specification.

This invention relates to machines by which successive items can be added together, the separate items and the totals indicated, and if necessary printed.

The invention relates more especially to machines of the above character which are provided with a keyboard comprising only one key for each digital series, and in which on the operation of the keys a traversing carriage successively sets mechanism by which the movements of racks, either rectilinear or circular, are limited according to the values of the keys depressed, the racks being ultimately brought into gear with suitable adding and printing mechanism.

According to the present invention, as the keys are successively depressed, the racks, which may be either rectilinear or circular, are released one at a time and move under the action of gravity or springs until arrested by stops which are carried in a stationary perforated frame, the respective stops being successively projected by plungers carried by a traversing carriage, there being one plunger for each digital series of stops, which plunger is operated in any position it may be in by its respective key, through a parallel bar and suitable intermediate mechanism, the projected stops and racks after each completed setting operation being returned by suitable means.

The invention also comprises the combination of suitable indicating and adding trains or totaling mechanism and suitable printing mechanism.

The accompanying drawings illustrate one machine according to the invention suitable for adding monetary items by way of example, Figure 1 being a side sectional elevation of the machine, showing a pounds rack in the normal position.

Figure 1:
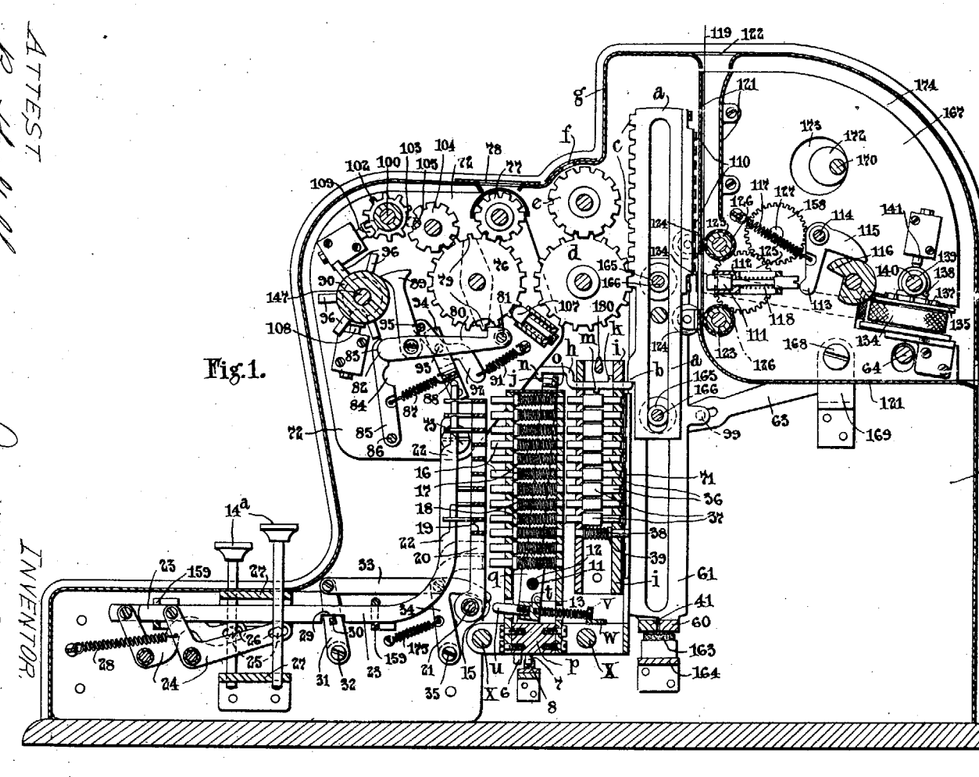
Figure 4:
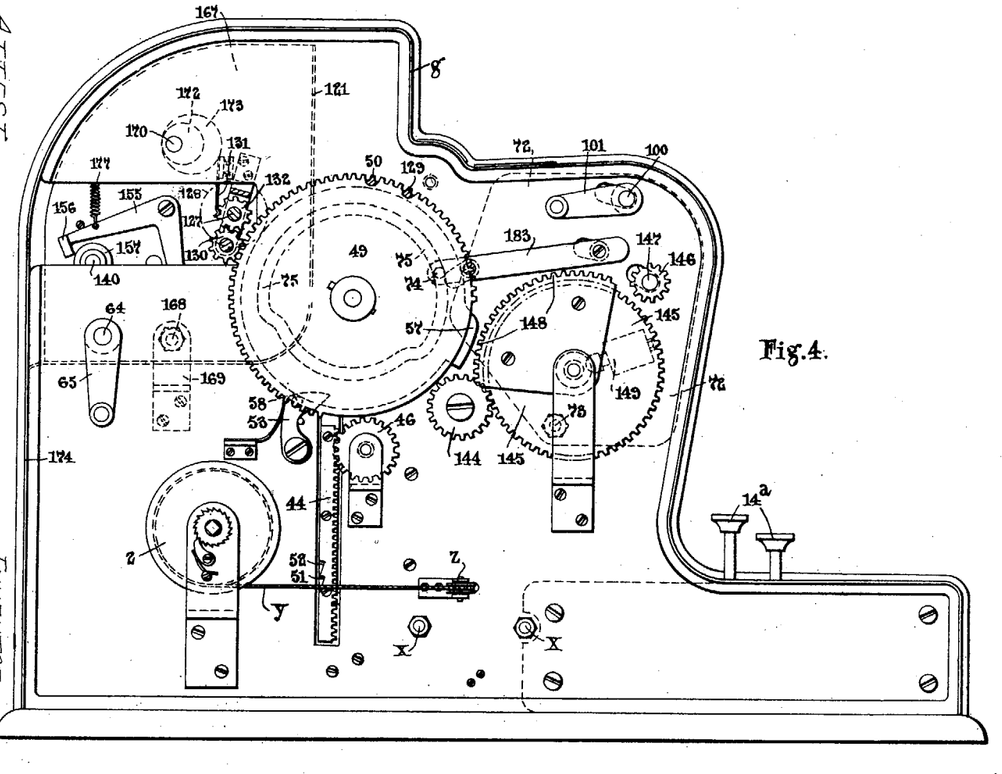
Figures 8, 9, 10, 11:
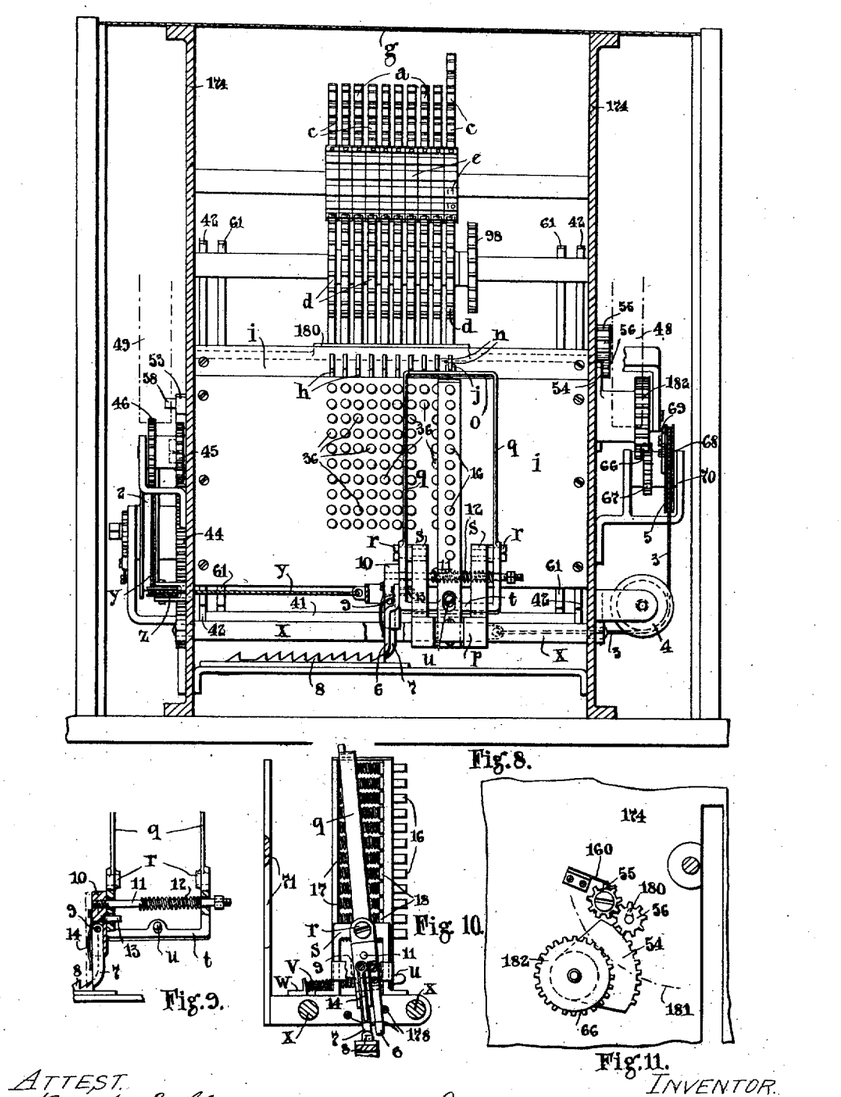
Fig. 8 is a front sectional elevation showing the setting mechanism.
Fig. 9 is a view of a detail connected with the traversing carriage.
Fig. 10 is a left hand side view of the traversing carriage.
Fig. 11 is a view of a detail of the gearing for returning the bars which hold the racks in the normal position.
Figure 12:
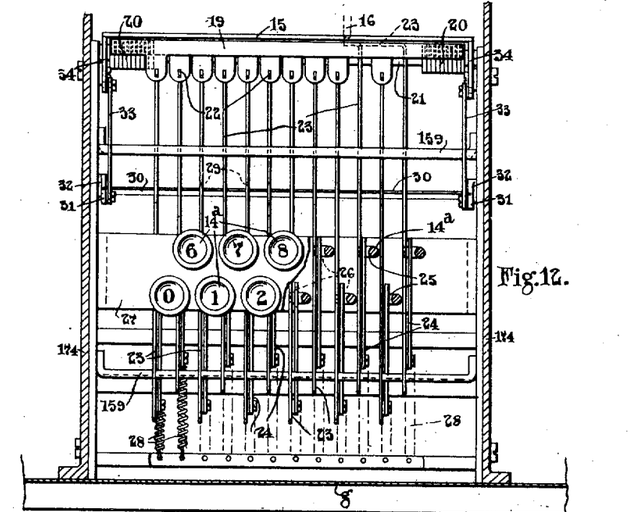
Fig. 12 is a plan of the key mechanism.
Figures 13, 14:
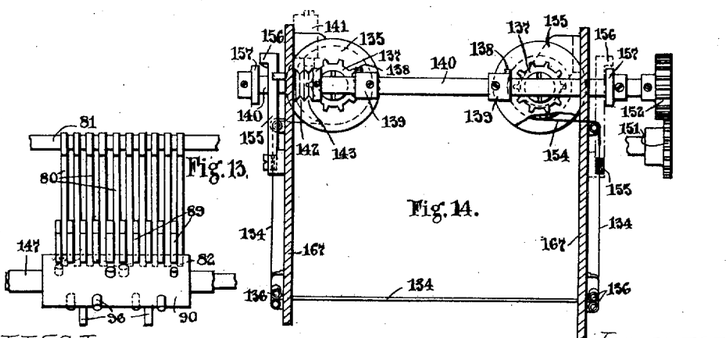
Fig. 13 is a plan of carrying mechanism.
Fig. 14 is a plan of ribbon feeding mechanism.

In carrying out the invention according to one mode as applied to a machine for adding pounds, shillings and pence, a number of rectilinear racks $a$, are arranged so that when released they fall by gravity, the racks running on rollers 165 mounted on spindles 166. Each rack has a retaining and limiting tooth, $b$, and a set of teeth $c$, meshing with a pinion $d$, which in turn meshes with an indicating disk $e$, bearing numerals corresponding to the value of the rack and which are visible through an aperture $f$, in the top cover or casing $g$. Each rack $a$, is normally retained in the raised position indicated in Fig. 1 by a detent $h$, guided in a frame $i$, and provided with two stops $k$, $m$, for limiting its outward and inward movements and with a hook $n$ which is adapted to be engaged by a tooth $j$ on a releasing bar $o$, carried by a traversing carriage $p$. The bar $o$, has two side portions $q$, pivoted at $r$ to brackets $s$, Fig. 2, on the carriage $p$. The side portions $q$ are united at the lower ends by a cross member $t$, Figs. 1, 8 and 9, provided with a pin $u$ on its front. A spring $v$, abutting at one end against a stop $w$, and at the other against the rear of the member $t$, maintains the bar $o$, in the normal position indicated in Fig. 1. The carriage $p$, slides on guide rods $x$, under the influence of a cable $y$, passing over a guide roller $z$, to a spring drum 2, Fig. 4, the carriage being returned, after it has completely traversed the machine, by a cable 3 passing over a guide pulley 4 to a winding pulley 5 rotated at the correct time as hereinafter described. The carriage $p$, is also fitted with two dogs 6 and 7 for engaging an arresting ratchet 8. The dog 6 is rigid with one of the side portions $q$, while the other 7 is pivoted on a pin 9 in a small block 10 mounted on a pin 11 passing through the side portions $q$ and impelled forward relatively thereto by a spring 12. A second small pin 13 prevents the block 10 oscillating. A spring 14 bears on the dog 7 and presses it against the block 10, Fig. 9, the dog being free to oscillate about the pin 9 to permit rearward movement of the carriage $p$, but preventing forward movement thereof. The carriage $p$, is adapted to move forward step by step as the frame $o$, $q$, $t$, is oscillated, by depression of keys $14^a$, which, as hereinafter described cause a master bar 15 to strike the pin $u$. On the rearward movement of the member $t$, the dog 7 is withdrawn from a tooth of the ratchet bar 8, and shoots forward under the action of the spring 12, but the rigid dog 6 is thrust into engagement. On the return movement of the frame, under the action of the spring $v$, the rigid dog 6 is withdrawn from the ratchet teeth while the dog 7 moves in front of and engages the next succeeding tooth of the ratchet 8, the carriage $p$ thus advancing one tooth only.

Stops 178 limit the movement of the frame $o$, $q$, $t$ in both directions.

The carriage $p$ is fitted with a vertical series of plungers 16 each held in the normal position, indicated in Fig. 1, by a spring 17 abutting against a collar 18 on the plunger. These plungers 16 are adapted to be engaged by parallel bars 19 supported by end members or levers 20 rocking about a shaft 21. The bars 19 are connected to the upturned ends 22 of the links 23 pivoted to bell crank levers 24, to which the keys $14^a$ are connected by pins 25 entering slots 26 in the ends thereof. The keys $14^a$ are guided in plates 27. Springs 28 return the above mentioned parts to their normal positions. Each link 23 has a slot 29 through which a cross bar 30 passes, the bar 30 being carried by levers 31 pivoted at 32 and connected by links 33 to levers 34 pivoted at 35 and carrying the master bar 15 before referred to. Springs 175 return the bars 15 and 30 and the levers 31 and 34 to their normal positions. The links 23 corresponding to the keys $14^a$ for the numerals 10 and 11 are formed so as to directly operate the corresponding plungers 16, instead of through the medium of the bars 19, these links only being required to operate the plungers 16 when the carriage $p$, is opposite to the pence rack. The links 23 are guided in their movements by plates 159 having slots for the links 23.

When any key is depressed the master bar 15 depresses the pin $u$, and causes the traversing carriage $p$, to advance one tooth.

A number of stop pins 36 are arranged in a perforated stationary frame $i$, and when projected as hereinafter described engage the teeth $b$ in the racks and limit the fall of the latter when released. The pins 36 have enlargements 37 to limit their inward and outward movements. There is a complete set or vertical series of pins 36 for each rack $a$, for example 10 in the series 0 to 9 inclusive, with the exception of the pence rack which has 12 pins for the digits 0 to 11 inclusive, and the tens shillings rack which has only two pins for the digits 0 and 1. The stop pins 36 are projected one at a time by the plungers 16 there being one plunger for each digital series. The plunger thrust forward at any time corresponds to the key $14^a$ depressed, for instance, if the key $14^a$ bearing the numeral 5 is depressed that plunger 16 is thrust out which will limit the movement of the respective rack $a$, so that 5 will be indicated whether units, tens of pounds, units of shillings or pence corresponding to the order in which the key is depressed $i.$ $e.$ if it is the sixth key depressed then 5 will represent five in the hundred pounds column.

Figures 5, 6:
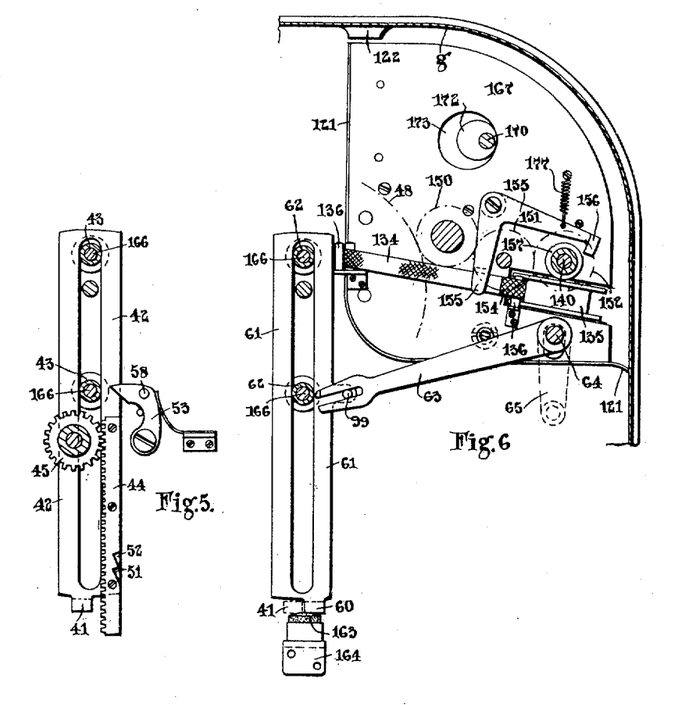
Fig. 5 is a detail view of the rack mechanism used for returning the racks to the zero position.
Fig. 6 being a detail view of the same mechanism adapted for hand operation to permit of return of the racks for rectifying errors.

The last or lowest stop 36 in each vertical series is preferably projected by means of a spring 38 abutting against a collar 39 on the stop pin 36 so as to positively limit the fall of the racks $a$. After the racks $a$, have fallen to their respective stop pins 36 and the printing has been effected, as hereinafter described, the racks $a$ are returned to their initial position by means of a lifting bar 41 carried by vertical side frames 42 running on guide rollers 43 and having racks 44 meshing with pinions 45, Fig. 5, on the same spindles as pinions 46 adapted to be rotated by segments 47 on two main wheels 48, 49 and also by single teeth 50 thereon, Figs. 3, 4 and 7 as hereinafter described. The side frames 42 each have two notches 51, 52, with which spring pressed detents 53 engage and hold the frames in either of the two positions hereinafter referred to as the zero and blank position respectively.

The segments 47 return the racks $a$ to the zero position and the single teeth 50 afterward complete their movement into the blank position. This arrangement is adopted to avoid printing of naughts to the left of the digit of highest value in the pounds column. When the racks have been returned to the blank or normal position the detents $h$, Fig. 1 are returned by means of rotating bar 180 engaging the stops $k$ so that the detents engage the teeth $b$ on the racks to retain the latter when the lifting bar 41 is lowered. The bar 180 is rotated by a segment 181 on the main wheel 48 Fig. 3 which at the correct time drives a pinion 182, Fig. 10 and oscillates a small segment 54 which drives an intermediate pinion 55, meshing with a pinion 56 on the cylindrical end of the bar 180. A spring 160 holds the bar 180 in its normal position as shown in Fig. 11. The lifting bar 41 falls under the action of gravity when cams 57 on the main wheels 48, 49 engage arms 58 on the detent 53 and disengage the latter from the notches 51.

In order to enable the racks to be returned to the blank or normal position in the event of an error in setting, and without operation of the adding trains and printing mechanism an auxiliary lifting bar 60, is provided. This bar 60 is secured to side frames 61 running on rollers 62 and adapted to be raised by forked levers 63 mounted on a shaft 64 fitted with a handle 65, Figs. 1, 2 and 6, the forked levers 63 engaging pins 99 on the side frames 61. The side frames 61 of the bar 60 rest on or overlap the lifting bar 41 so that the bar 60 can move alone when the handle 65 is moved but is carried by and moves with the bar 41 when the latter is raised by the main handle 59 and mechanism before referred to.

Buffers 163 of rubber or the like are mounted on a plate 164 to break the force of the fall of the bars 41 and 61.

Before the racks are returned to correct an error in setting the printing mechanism is disengaged as hereinafter explained. The racks may be then returned and then the main handle 59 is rotated to rotate the main wheels 48, 49 and thereby effect the return of the traversing carriage $p$, and of the detents $h$, and also the return of the stop pins 36. The return of the carriage is effected by the segment 181 on the main wheel 48 engaging the pinion 182, Figs. 3 and 10, which has some of its teeth reduced in thickness so that a gap 66 is normally opposite a loosely mounted pinion 67 which has a single tooth 68 formed on its boss in addition to its other teeth, adapted to engage a spring pressed pawl 69 on the pulley 5 for the cable 3 before referred to. The broad teeth on the pinion 182 are of a number which will suffice to rotate the pinion 67 through one revolution.

When the pulley 5 has been rotated by the tooth 68 sufficiently to return the carriage, the pawl 69 then strikes a stop 70 and releases the tooth 68 so that the remaining movement of the pinion 67 is non-effective.

Spring brakes 161 and 162 hold the pinions 182 and 67 in their normal positions.

The return of the stop pins 36 is effected by a wiper 71 having beveled edges as shown in section in Fig. 10. The wiper 71 is carried by the traversing carriage $p$ and when the latter is returned to its initial position the wiper passes over and returns all the stop pins 36 which were previously projected. The wiper 71 also serves to return any of the stop pins 36 which may have inadvertently been projected during the forward movement of the carriage $p$.

When the racks are about to be returned to the zero position after an item has been set, an adding train or totaling mechanism is thrown into gear with the racks so that the operation of returning them to the zero position transfers the item to the totaling mechanism.

In the example illustrated the totaling mechanism is carried by end plates 72 pivoted on pins 73 to the main casing of the machine. The plates 72 are connected to links 183 having pins 74 engaging in cam slots 75 in the main wheels 48, 49, arranged to swing the totaling mechanism into and out of gear at the correct time. The totaling mechanism comprises a set of pinions 76 adapted to be brought into gear with the rack pinions $d$, so as to receive the item set on the racks. The totaling pinions 76 mesh directly with indicating disks 77 so that the total can at any time be seen through an aperture 78 in the top cover. The pence indicating disk 77 bears numerals 0 to 11, the tens shillings disk bearing the numeral 1 opposite each alternate tooth, the remainder of the disks bearing numerals 0 to 9. In order to enable carrying on to be effected between the pinions 76 each is provided with two single teeth 79 adapted to trip a lever 80, pivoted at 81, and thereby to shift the free end 82 of said lever from one recess 83 to another 84, in a lever 85, pivoted at 86, and held up by a spring 87 attached to a stationary bar 88. Each lever 80 carries a pivoted pawl 89 held up to a roller 90 by a spring 91 acting through levers 92 pivoted at 93 to brackets 94 and connected by a bar or rod 95 pressing on all the pawls 89. When a lever 80 is tripped as aforesaid, its pawl 89 is brought into an operative position for engaging with, and transmitting the unit to be carried to, the next succeeding pinion 76. When all the necessary pawls have been so set and the totals mechanism is thrown out of gear as described, the roller 90 is rotated and by means of helically arranged pins 96 thereon (so placed that the pin on the extreme left comes into operation last) it throws the set pawls into engagement with their respective pinions and at the same time shifts the levers 80 into their normal positions, that is moves their ends 82 from the recesses 83 to the recesses 84.

It may happen in carrying on in the manner described that some more of the levers 80 may be tripped, and for this reason the roller 90 is given two revolutions for each operation, it being rotated at the correct time by the main wheel 49 through a pinion 144, a wheel 145 engaging therewith and carrying a segment 148 with the requisite number of teeth, adapted to mesh with a pinion 146 on the shaft 147 on which the roller 90 is mounted.

The segment 148 is held in its normal position out of gear with the pinion 146 by means of a spring plunger brake 149.

In the example shown the totaling pinion 76 for the pence has twenty-four teeth, the other pinions 76 for the shillings and pounds having twenty teeth. Hence that for the pence is larger and to avoid the difficulty of bringing it into gear with the respective rack pinion $d$ with the same movement as the other pinions, the respective rack pinion $d$ is secured to or formed integrally with a smaller pinion 98 for meshing with the pence pinion 76.

A pinion 97 formed integrally with the pence pinion 76 and of the same size as the other pinions 76 meshes with the pence indicating disk 77. The tens shillings pinion 76 is provided with a carrying tooth adjacent to every alternate tooth on the pinion.

Figure 2:
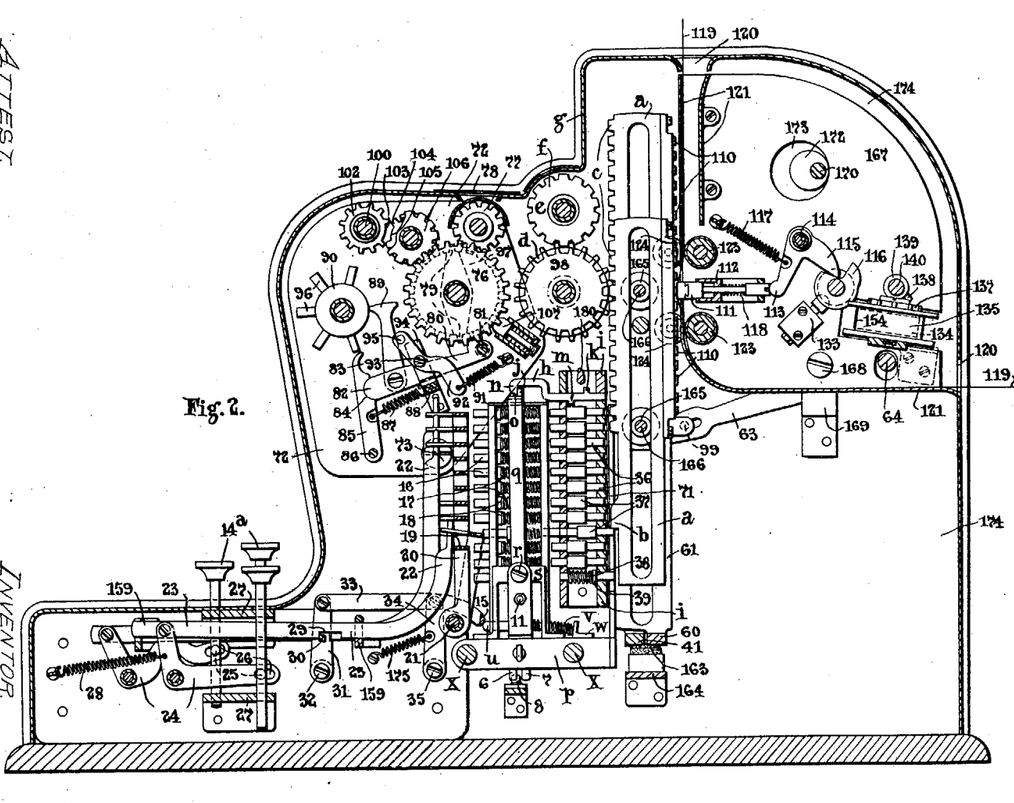
Fig. 2 is a side sectional elevation of the machine, showing a pence rack in the dropped position, after the corresponding key has been depressed.
Figure 7:
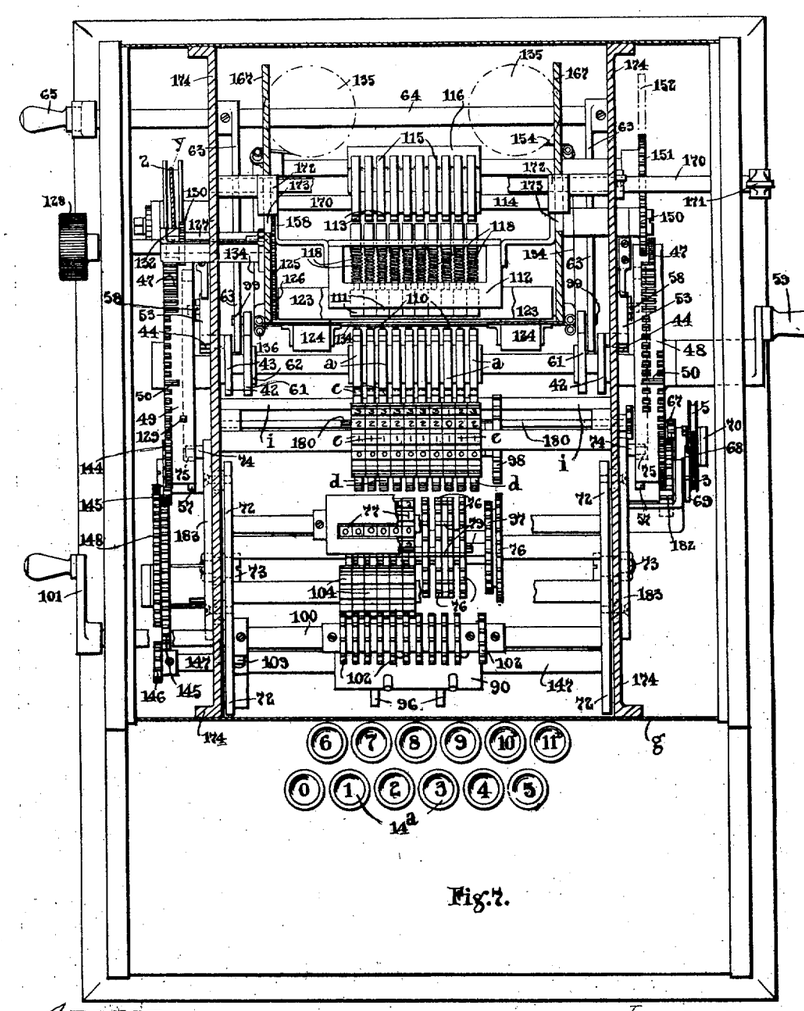
Fig. 7 is a plan of the machine with the top cover or casing removed.

The totaling train is cleared to zero when required, by means of a clearing spindle 100, Figs. 1, 2 and 7, the spindle being fitted with a handle 101 and a series of clearing pinions 102, each having a gap 103. The clearing pinions 102 mesh with intermediate pinions 104 meshing with the totaling pinions 76 and also having gaps 105 which when clearing is effected, coincide with the gaps 103. In the example illustrated, wherein the totaling pinion 76 for the pence has twenty four teeth and the other pinions 76 each have twenty teeth, the pinions 102, 104, for the pence pinion 76 have 12 teeth, whereas the others have ten teeth, and also the pinion 104 for the pence pinion 76 does not gear directly therewith, but through a pinion 106 meshing with the pinion 97 above referred to. The intermediate clearing pinion 104 for the tens shillings pinion 76 has a gap 105 opposite every alternate tooth. Each of the totaling pinions 76 has a spring plunger brake 107 and the carrying on shaft 147 and clearing spindle 100 have similar brakes 108, 109, respectively as shown in Fig. 1.

Each item set on the racks is printed by means of type 110 carried upon the racks $a$. These type are arranged in relation to the stop pins 36, so that according as the stops projected for any particular item arrest the racks so will the corresponding type be brought opposite to plungers 111, Figs. 1, 2 and 7. The plungers work in guides 112, and are adapted to be struck by hammers 113, pivoted on a shaft 114, and having arms 115, bearing on cams 116, on to which they are held by springs 117, so that when the cams are rotated the springs 117 are first tensioned and then as the arms 115 are released by the cams the springs cause the hammers 113 to strike the plungers. The latter are returned by springs 118.

Figure 3:
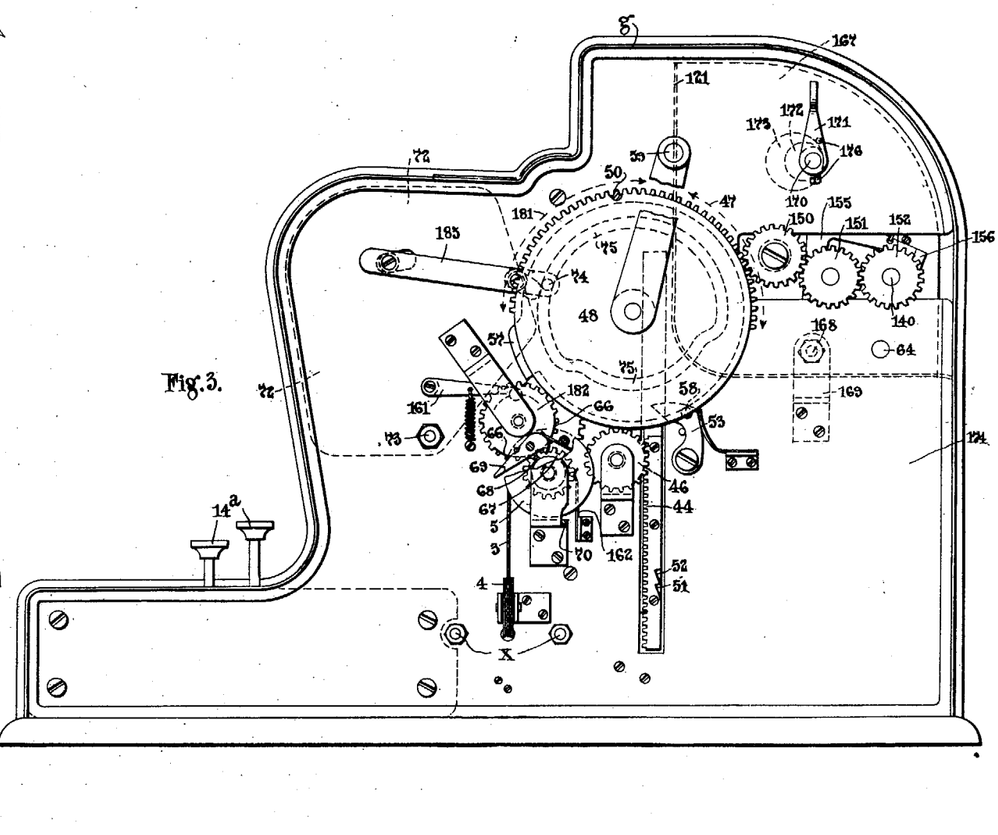
Figs. 3 and 4 are right and left hand end elevations of the machine.

The cam shaft has a spring plunger brake 133 to hold it in its normal position and it is driven at the correct time by the main wheel 48 through the medium of pinions 150, 151, Fig. 3.

The pence rack $a$, bears type corresponding to the numerals 0 to 11, the tens shillings rack having only the type numeral 1, the remainder, of the racks having type numerals 0 to 9.

The paper 119 to receive the record is fed in at an aperture 120 in the casing and is guided by aprons 121 out through an aperture 122. The paper is fed by means of two rollers 123 bearing on rollers 124. The rollers 123, are geared together by a pinion 125, meshing with pinions 126, on the rollers and with a pinion 158, the pinion 158 being mounted on a shaft 127 fitted with a hand wheel 128. The requisite step by step feed for the paper is effected by a tooth 129, Figs. 4 and 7, on the main wheel 49 engaging a pinion 130 meshing with a pinion 132 on the shaft 127. A spring brake 131 holds the shaft 127 in any position it may be left. The paper 119 passes between the plungers 111, and an inking ribbon 134, the ribbon being wound on and off spools 135, and between guide rollers 136, Figs. 1, 2 and 4.

The spools 135, are provided with star wheels 137 rotated intermittently by single teeth 138 on bosses 139 mounted on a shaft 140, which is capable of sliding axially from one position to another, determined by a spring plunger 141, engaging in one or the other of two grooves 142, 143. According to the position of the shaft 140 so will one or other of the spools 135 be rotated, the shaft 140 being driven by a pinion 152, engaging the pinion 151, Fig. 3.

The shaft 140 is shifted axially each time a spool is completely unwound by a thickened portion 154 at either end of the ribbon engaging a rocking lever 155, the ribbon passing freely through a slot therein which is too narrow to allow passage of the part 154. Each lever 155 has a cam surface 156 adapted to engage a collar 157 on the shaft 140 and is returned to its normal position by a spring 177.

The printing mechanism is mounted between side plates 167, pivoted on pins 168 to brackets 169 secured to the side frames 174 of the machine.

When it is required to throw the printing mechanism out of gear when correcting an error as before described this is effected by a spindle 170 having a handle 171 and cams 172 which when rotated by the handle 171 engage the sides of recesses 173 and turn the printing frame about its pivots 168 so as to disengage the pinion 150 from the main wheel 48. Pins 176 limit the movement of the handle 171.

Figure 15:
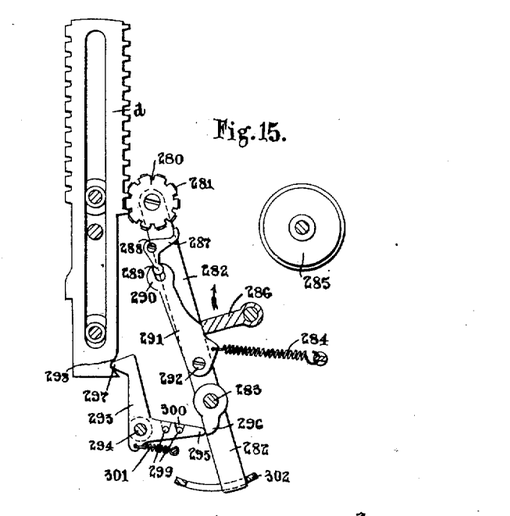
Fig. 15 is a view of a modified form of printing mechanism.

An alternate form of printing mechanism is illustrated in Fig. 15, in which each rack is adapted, during the setting of an item, to gear with a wheel 280, provided with type numerals 281 on its periphery, so that according to the digit of an item set on the rack, the wheels 280 are rotated to bring the corresponding type numeral 281 into the printing position.

Each type wheel 280 is rotatably mounted on a plate or lever 282 pivoted at 283, and adapted to move, under the action of a spring 284, to sharply strike the type numeral against a platen 285, when released by a bar 286 rotated by any suitable means from the main operating handle, the levers 282 being guided by slots in a plate 302. Each type wheel 280 is free to rotate when it is in gear with its corresponding rack, but during the printing operation it is adapted to be locked in the position set, by means of a pawl 287, pivoted at 288 and having its end 289 in engagement with the forked end 290 of a lever 291 pivoted at 292 and adapted to move under the action of the spring 284, on the first movement of the bar 286, and before its type wheel 280 is moved out of engagement with the rack.

It will be seen that the wheels 280 are rotated to the correct printing position during the setting operation, after which the main operating handle is rotated, which in turn rotates the bar 286 to first release the levers 291, to throw the pawls 287 into position to lock their respective wheels 280 and then to release the levers 282 which move under the action of the springs 284 and print the item on a suitable paper strip on the platen 285. On further rotation of the operating handle the levers 282 are first returned to their normal positions and then the pawls 287 are released from their wheels 280 to allow them to be returned to normal position when the racks are returned to zero.

To prevent the printing of naughts to the left of an item, each lever 282 is adapted to be locked when its corresponding rack is not moved, by a detent 293 pivoted at 294 and having one end 295 normally engaging a heel 296 on the plate 282, the other end 297 engaging a recess 298 on the periphery of the rack. Immediately a rack is moved its detent 293 is moved to release the heel 296 of the corresponding plate 282 and by means of pins 299, and slots 300 to release all those detents to the right but to leave those to the left in the locked position. Springs 301 restore the detents 293 to normal position.

In practice the item to be added is set on the racks by means of the keys it being duly indicated and if found correct, the main handle is then rotated effecting in turn the printing, return of racks and transference of the items to the totaling mechanism, the total being duly indicated, return of the carriage and carrying-on in the totaling train.

It is to be understood that the invention is not confined to the special forms of totaling and printing mechanism hereinbefore described by way of example as these may be variously modified. Obviously curved or circular racks may be substituted for the rectilinear racks in which case the perforated casing is arranged in a curved form to suit, the stop pins being radially arranged.

I claim—

1. In an adding machine, the combination of a plurality of racks each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, and a single series of keys for simultaneously operating said means and projecting said stops.

2. In an adding machine, the combination of a plurality of racks each adapted to move under the action of gravity, a series of stops for limiting the movement of each rack, a stationary frame carrying said stops, a single series of spring-pressed plungers, a traveling carriage carrying said plungers, detents for holding said racks in normal position, means carried by said carriage for effecting a step-by-step movement thereof and for successively engaging said detents to release said racks, a single series of keys for simultaneously operating said means and projecting said stops, and means for returning said detents to normal position upon the return of the racks.

3. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, and means for returning said carriage to its normal position.

4. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, means for returning said carriage to its normal position and a wiper adapted to return any stops projected on both the forward and backward movement of the carriage.

5. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys and means operated by said keys for simultaneously projecting a stop and operating said carriage-advancing and rack-releasing means.

6. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, and means for returning said racks to their normal position after each setting operation.

7. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, and means for returning said racks to their normal positions to permit correction of errors in setting.

8. In an adding machine, the combination of a plurality of racks each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, a totaling mechanism, means for throwing said totaling mechanism into gear with the racks after each setting operation and means for returning said racks to their normal position to transfer the item set to the totaling mechanism.

9. In an adding machine, the combination of a plurality of racks each adapted to move under the action of gravity, a series of stops for limiting the movement of each rack, a stationary frame carrying said stops, a single series of spring pressed plungers, a traveling carriage carrying said plungers, means carried by said carriage for effecting a step-by-step movement thereof and for releasing said racks, a single series of keys for simultaneously operating said means and projecting said stops and means for printing the items set on the racks.

10. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for releasing said racks, a single series of keys for simultaneously operating said means and projecting said stops, type carried by said racks, means for printing from said type, means for retaining said racks with the zero type above the printing line to prevent printing of naughts to the left of the digit of highest value in an item, a totaling mechanism and means for arresting the racks in the zero position, while the totaling mechanism is disengaged to prevent incorrect transference, and then returning the racks to normal position.

11. In an adding machine, the combination of a plurality of racks, each adapted to move under the action of gravity, a series of stops for limiting the movement of each rack, a stationary frame carrying said stops, a single series of spring-pressed plungers, a traveling carriage carrying said plungers, means carried by said carriage for effecting a step-by-step movement thereof and for successively releasing said racks, a single series of keys for simultaneously operating said means and projecting said stops, a totaling mechanism, a printing mechanism, rack carriage and detent returning mechanisms, paper and ribbon feeding mechanisms, carrying mechanism for the totaling mechanism, an operating handle and means for connecting said mechanisms with said operating handle in proper sequence.

In testimony whereof, I affix my signature in presence of two witnesses.

WILLIAM SCHOOLING.

Witnesses:
 A. W. MATHYS,
 B. H. MATTHEWS.